(12) United States Patent
Pantelias et al.

(10) Patent No.: US 9,020,014 B2
(45) Date of Patent: Apr. 28, 2015

(54) CONVERGENCE LAYER BONDING OVER MULTIPLE CARRIERS

(75) Inventors: Niki Pantelias, Duluth, GA (US); Scott Hollums, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 101 days.

(21) Appl. No.: 13/341,593

(22) Filed: Dec. 30, 2011

(65) Prior Publication Data
US 2013/0170528 A1 Jul. 4, 2013

(51) Int. Cl.
*H04B 1/38* (2006.01)
*H04L 12/28* (2006.01)

(52) U.S. Cl.
CPC ........ *H04L 12/2801* (2013.01); *H04L 12/2865* (2013.01); *Y02B 60/33* (2013.01)

(58) Field of Classification Search
USPC .......... 375/222; 370/431, 442, 461, 458, 465, 370/468, 516
See application file for complete search history.

(56) References Cited

U.S. PATENT DOCUMENTS

| | | | |
|---|---|---|---|
| 7,961,754 B2 | 6/2011 | Choi et al. | |
| 2007/0195817 A1* | 8/2007 | Denney et al. | 370/468 |
| 2009/0154538 A1 | 6/2009 | Kwon et al. | |
| 2010/0157920 A1* | 6/2010 | Choi et al. | 370/329 |
| 2011/0185263 A1 | 7/2011 | Chapman et al. | |

FOREIGN PATENT DOCUMENTS

KR 10-2007-0013984 A 1/2007

OTHER PUBLICATIONS

European Search Report for EP Patent Application No. EP12008493. 4, European Patent Office, Munich, Germany, mailed on Apr. 26, 2013.

* cited by examiner

*Primary Examiner* — Daniel Washburn
*Assistant Examiner* — Eboni Hughes
(74) *Attorney, Agent, or Firm* — Sterne, Kessler, Goldstein & Fox PLLC

(57) ABSTRACT

A cable modem termination system (CMTS) is disclosed that allocates one or more minislots of a super-frame arrangement to cable modems for upstream transmission. The super-frame arrangement includes multiple minislots that correspond to multiple communication channels of one or more super-frames. The CMTS receives requests for upstream bandwidth from the cable modems. The CMTS continuously allocates the minislots of the super-frame to provide upstream bandwidth grants to accommodate these requests. The CMTS communicates the upstream bandwidth grants as a single upstream bandwidth allocation map (MAP) to the cable modems.

20 Claims, 8 Drawing Sheets

CONVERGENCE LAYER BONDING OVER MULTIPLE CARRIERS

BACKGROUND

1. Field of Disclosure

Figure 1:
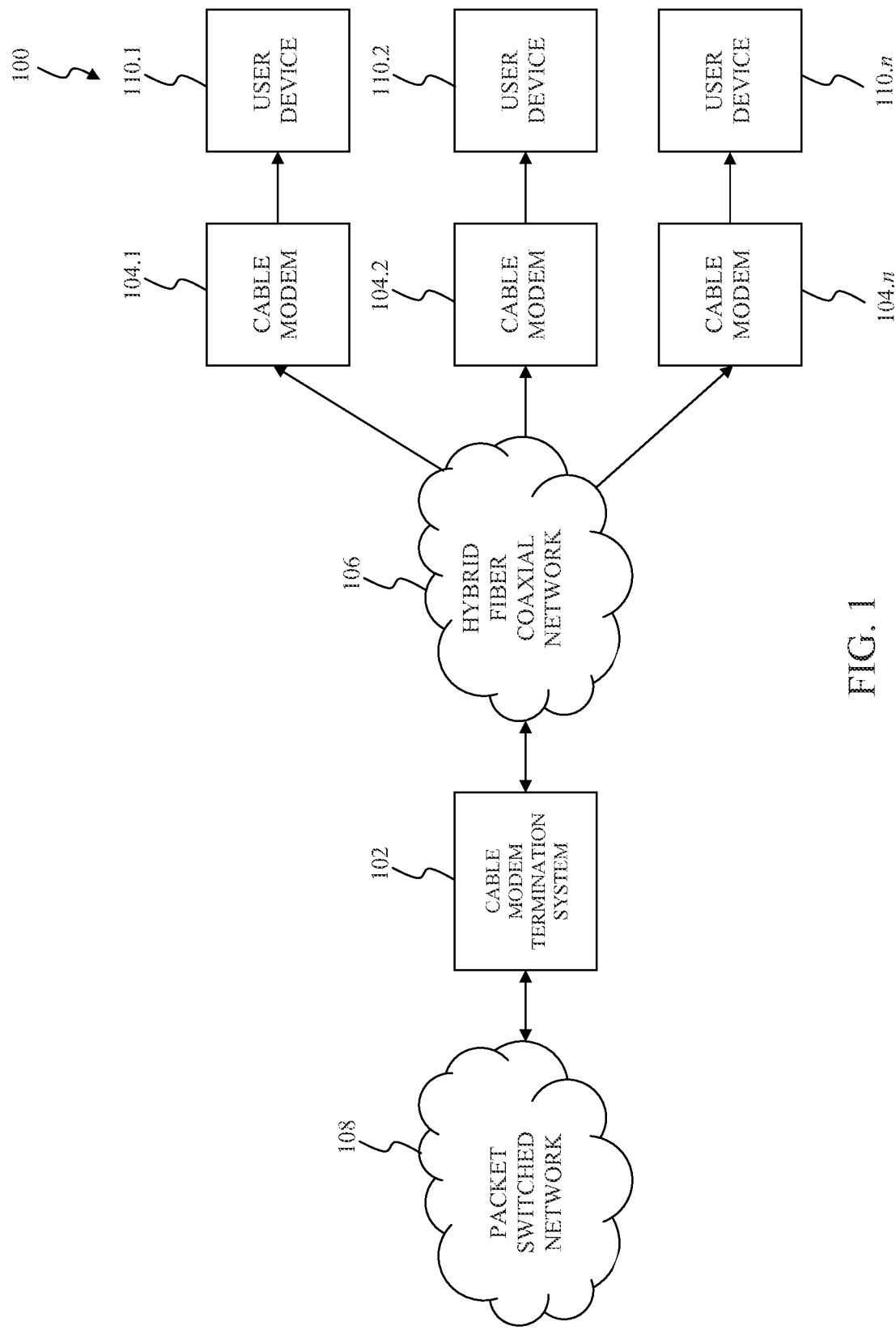

The disclosure relates to a cable communications system and more specifically to configuration and arrangement of an upstream in the cable communications system.

2. Related Art

Cable television (CATV) is a system of providing television, internet data, and/or other services to consumers via radio frequency signals transmitted to one or more customer premises through, but not limited to, optical fibers or coaxial cables as opposed to the over-the-air method used in traditional television broadcasting via radio waves.

A cable system may utilize Data Over Cable Service Interface Specification (DOCSIS) compliant equipment and protocols to carry out a transfer of information, such as video, audio, and/or data between one or more Set-top Devices or one or more Cable Modems (CM) and one or more cable modem termination systems (CMTS). The DOCSIS Specification generally refers to a group of specifications published by CableLabs® that define industry standards for the CMTS and the Set-top Device or the CM. In part, the DOCSIS specification sets forth requirements and objectives for various aspects of cable modem systems including operations support systems, management, data interfaces, as well as network layer, data link layer, and physical layer transport for data over cable systems. The DOCSIS interface specification entitled "Data-Over-Cable Service Interface Specifications, DOCSIS 3.0, MAC and Upper Layer Protcols Interface Specification, CM-SP-MULPIv3.0416-110623" is incorporated by reference herein in its entirety.

A DOCSIS cable system includes two primary components: one or more Set-top Devices and/or one or more CMs at a customer premises, and a CMTS located at a headend. As used herein, the term "downstream" refers to the transfer of information in a direction from the CMTS to the Set-top Devices or the CMs. The term "upstream" refers to the transfer of information in a direction from the Set-top Devices or the CMs to the CMTS. The DOCSIS specification allows for scheduling of information in DOCSIS service flows over multiple communication channels in the upstream.

DOCSIS originally provided for transmission over a single carrier, or a single communication channel at a time. In the upstream, each communication channel from among the multiple communication channels is viewed by a media access control (MAC) layer within the Set-top Devices or the CMs and/or the CMTS as a continuous stream of minislots, where a minislot represents the smallest unit of bandwidth allocation. Conventionally, these minislots are numbered in ascending sequential order using minislot numbers. The minislot numbers are used by the MAC layer in a upstream bandwidth allocation map message (MAP) to indicate which minislots are allocated to which CM.

More recent versions of DOCSIS allow for communication over multiple upstream communication channels at a time. This is termed channel bonding. Conventionally, one or more physical (PHY) layer parameters such as symbol or modulation rate, preamble length, minislot duration, modulation order, to provide some examples, of each upstream communication channel are configured independently of other upstream communication channels. Each upstream communication channel may have different capacity depending on noise and interference present on that upstream communication channel. Also, the minislots on each upstream communication channel are numbered in ascending sequential order independently of numbering of minislots of other upstream communication channels. The upstream communication channels may start numbering of their respective minislots from various starting points at various times, and count at varying rates depending on a slot size and a rate of the upstream communication channel, so at any given moment in time the current minislot numbers could be very different on different upstream communication channels.

Conventionally, the Set-top Devices or the CMs generally request upstream bandwidth by sending request messages to the CMTS. The CMTS may respond with various bandwidth grants allowing the use of one or more of the upstream communication channels. Typically, the CMTS may choose any combination of the upstream communication channels and make the bandwidth grants any length. At any given moment the CMTS may choose to distribute data differently across any of the upstream communication channels than it has previously or will in the future.

However, in practice, limits exist on the distribution of the data by the CMTS to allow for adequate system performance. For example, to minimize latency, the CMTS should not distribute the data over a very long bandwidth grant on one upstream communication channel and a very short bandwidth grant on another upstream communication channel. This would cause the CMTS to wait until the data is received from the long bandwidth grant and this would add latency to the data. Similarly, the CMTS should not distribute the data over a bandwidth grant that immediately begins on one upstream communication channel and a bandwidth grant that begins far in the future on another upstream communication channel.

As a result, the CMTS should maintain an awareness of the minislot numbering and duration represented by each minislot on each upstream communication channel and relationships of minislot numbering between upstream communication channels and timing relationships across upstream communication channels. The CMTS attempts to schedule bandwidth grants for various Set-top Devices or CMs to minimize latency while still providing fair service to all Set-top Devices or CMs. For large numbers of upstream communication channels, the complexity of tracking the slot numbering and timing relationships across upstream communication channels may be very high. In addition, the CMTS must send a separate MAP message for each upstream communication channel. This generates a large number of MAP messages when the number of upstream communication channels is large. For example, the CMTS must provide 32 separate MAPs to the Set-top Devices or the CMs, one for each upstream communication channel, when bonding 32 upstream channels which makes using a large number of upstream communication channels relatively complex.

Conventionally, the Set-top Devices or the CMs will receive multiple MAP messages for the multiple upstream communication channels in use. Each MAP message may contain a bandwidth grant to a Set-top Device or a CM. Conventionally, this bandwidth grant is indexed using the minislot numbering unique to that upstream communication channel. In order to minimize latency, the Set-top Device or the CM attempts to send earlier data in minislots that occur earlier in time, and later data in minislots that occur later in time. To do this, the Set-top Device or the CM must put the different received grants in time order across the upstream communication channels. This requires the Set-top Device or the CM to keep track of the relationships of slot numbering and duration across all upstream communication channels. For large numbers of upstream communication channels, this complexity may also be very high.

As a result of these shortcomings, channel bonding of upstream communication channels that were originally intended to be used in a single-carrier system adds a large amount of complexity to the conventional distribution of data. Thus, what is needed is a system and a method to efficiently distribute data over multiple upstream communication channels when bonding a large number of upstream communication channels to overcome the shortcomings stated above.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 2A:
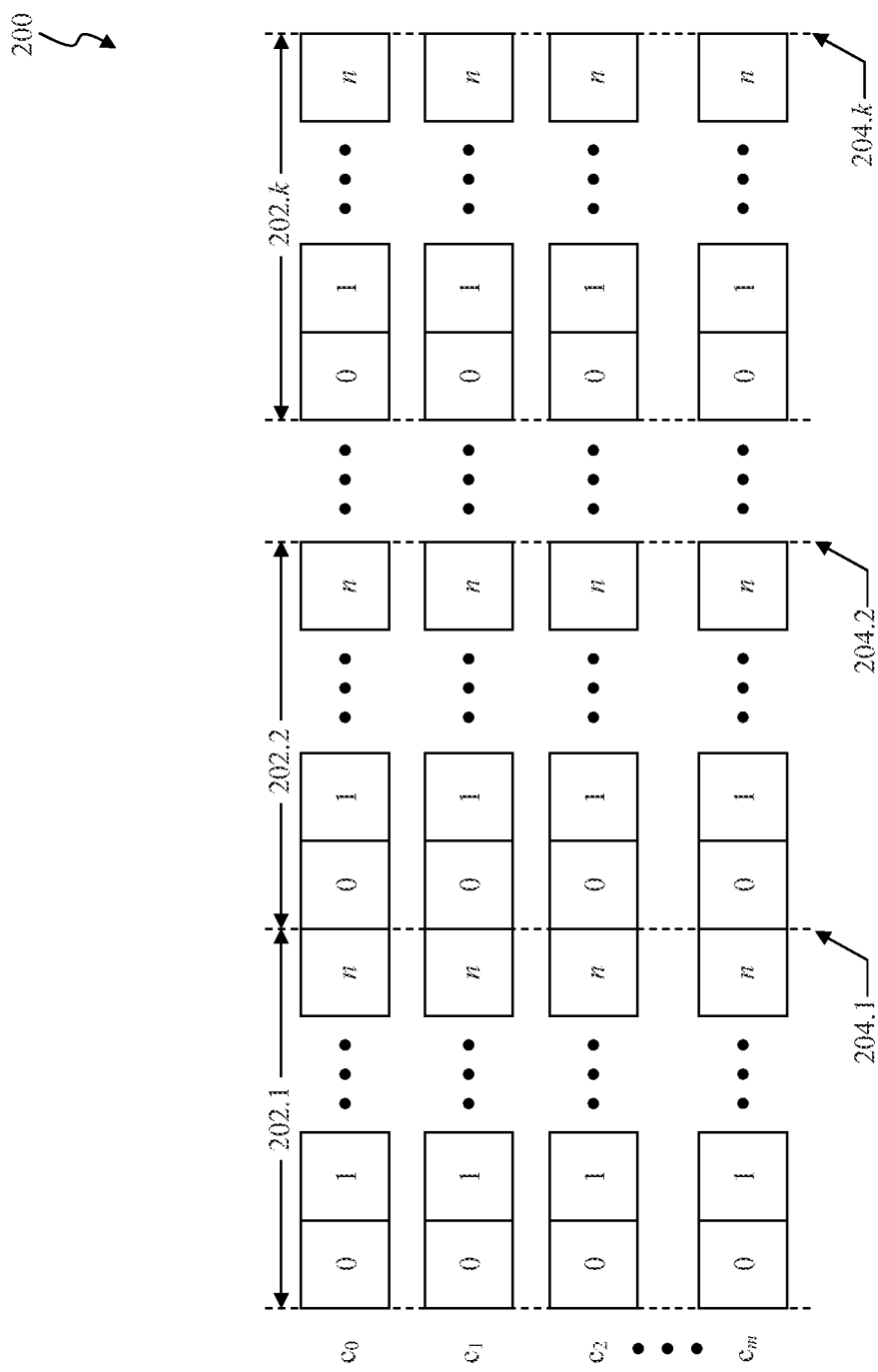
Figure 2B:
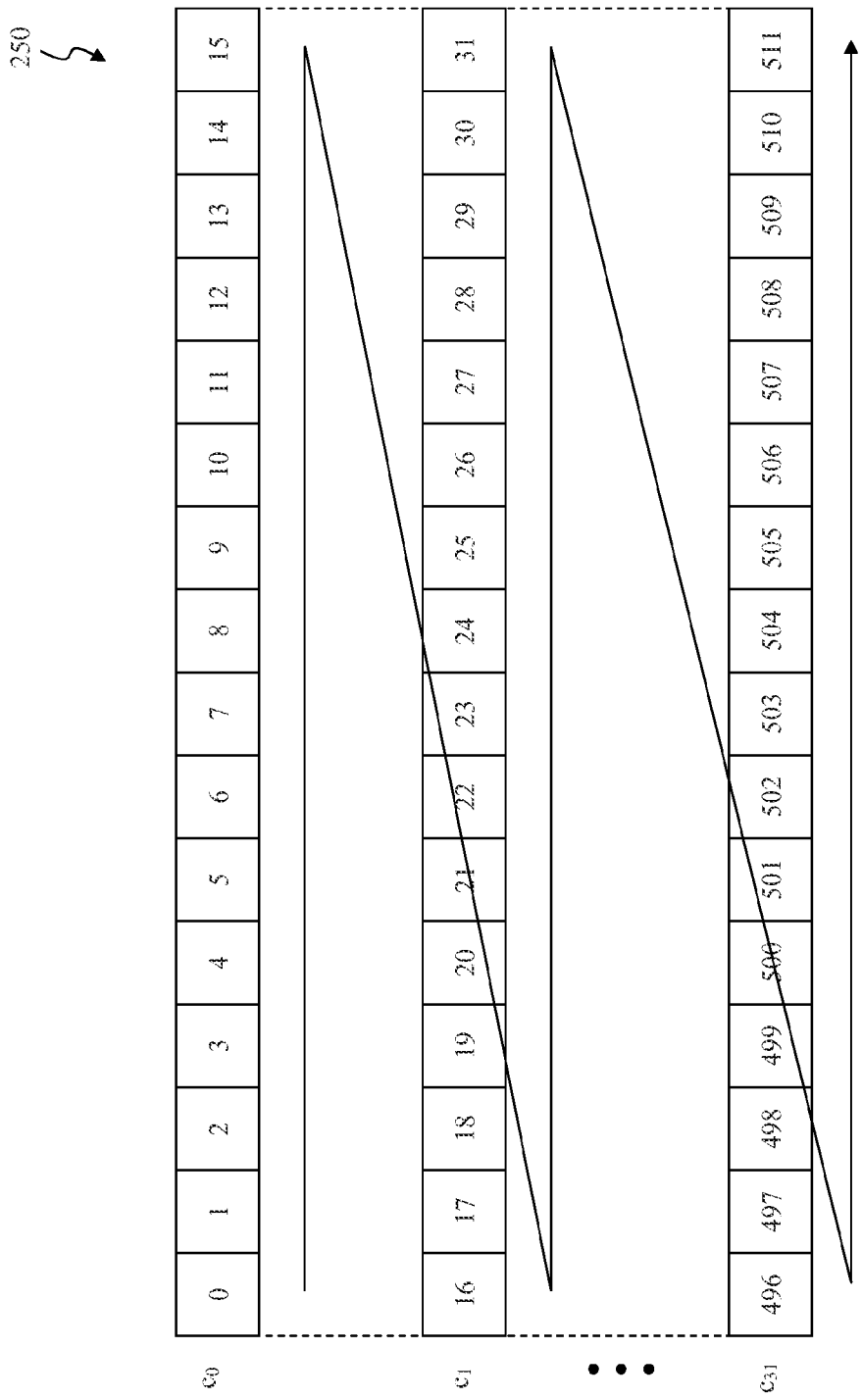
Figure 2C:
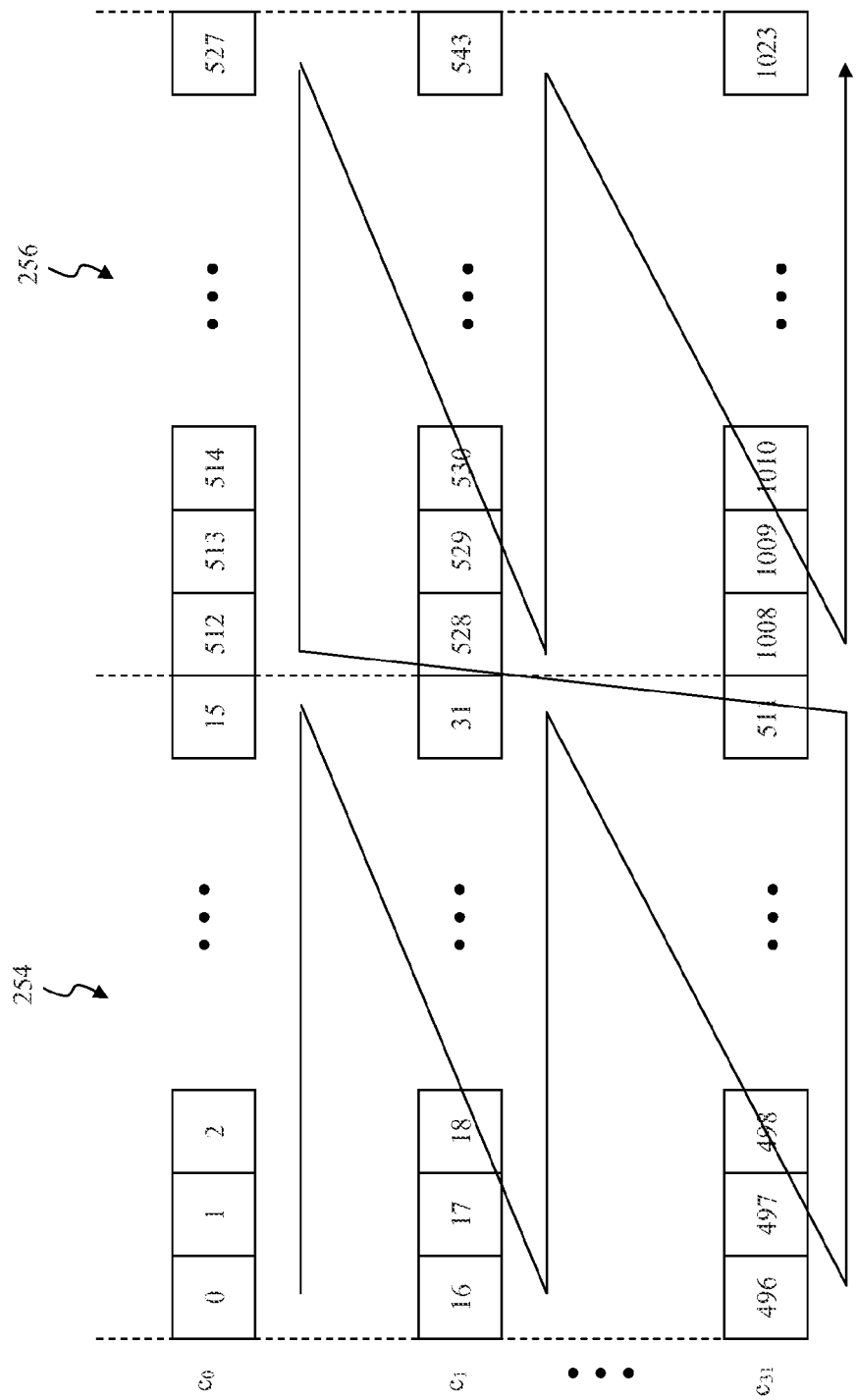
Figure 3:
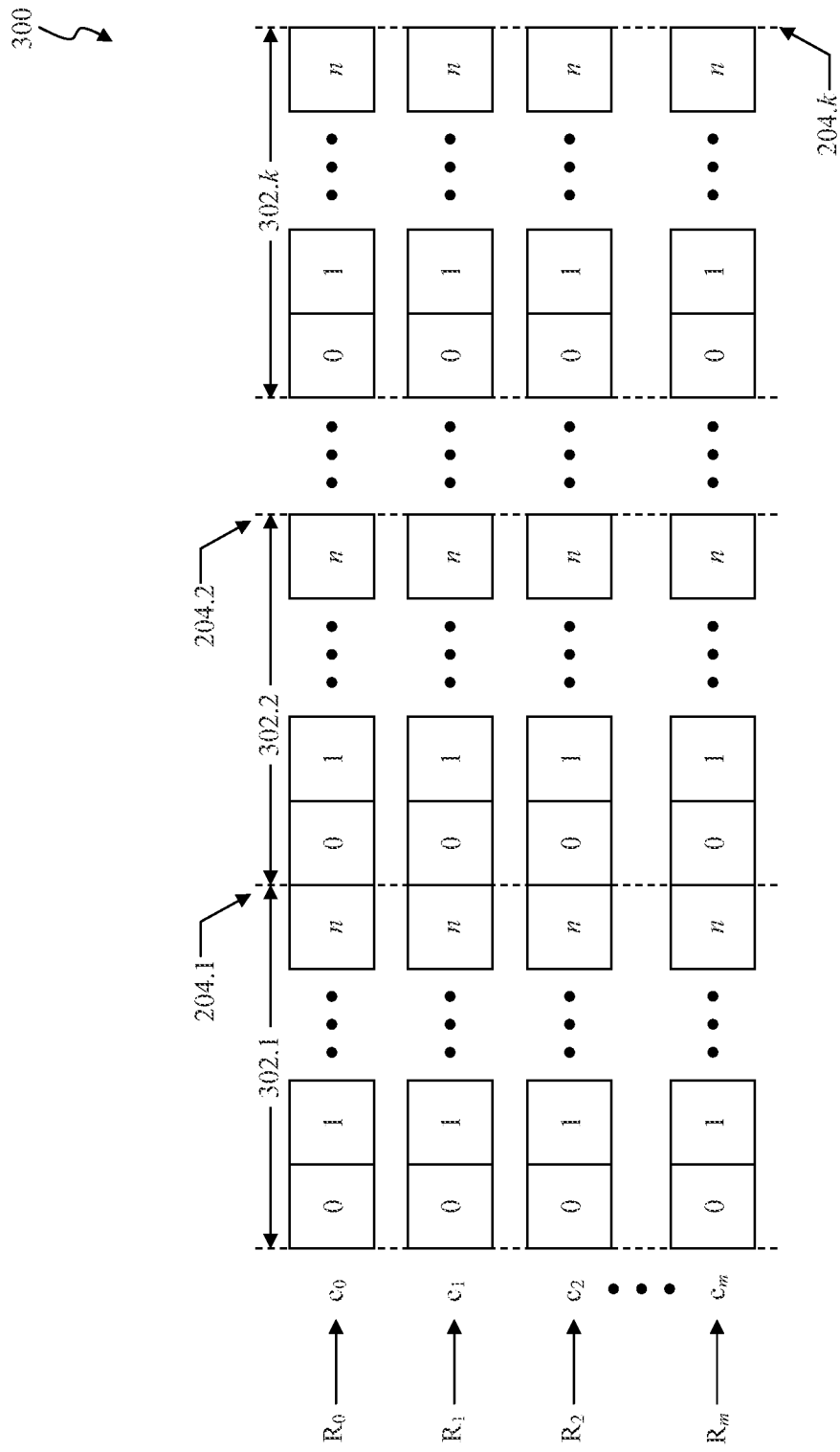
Figure 4:
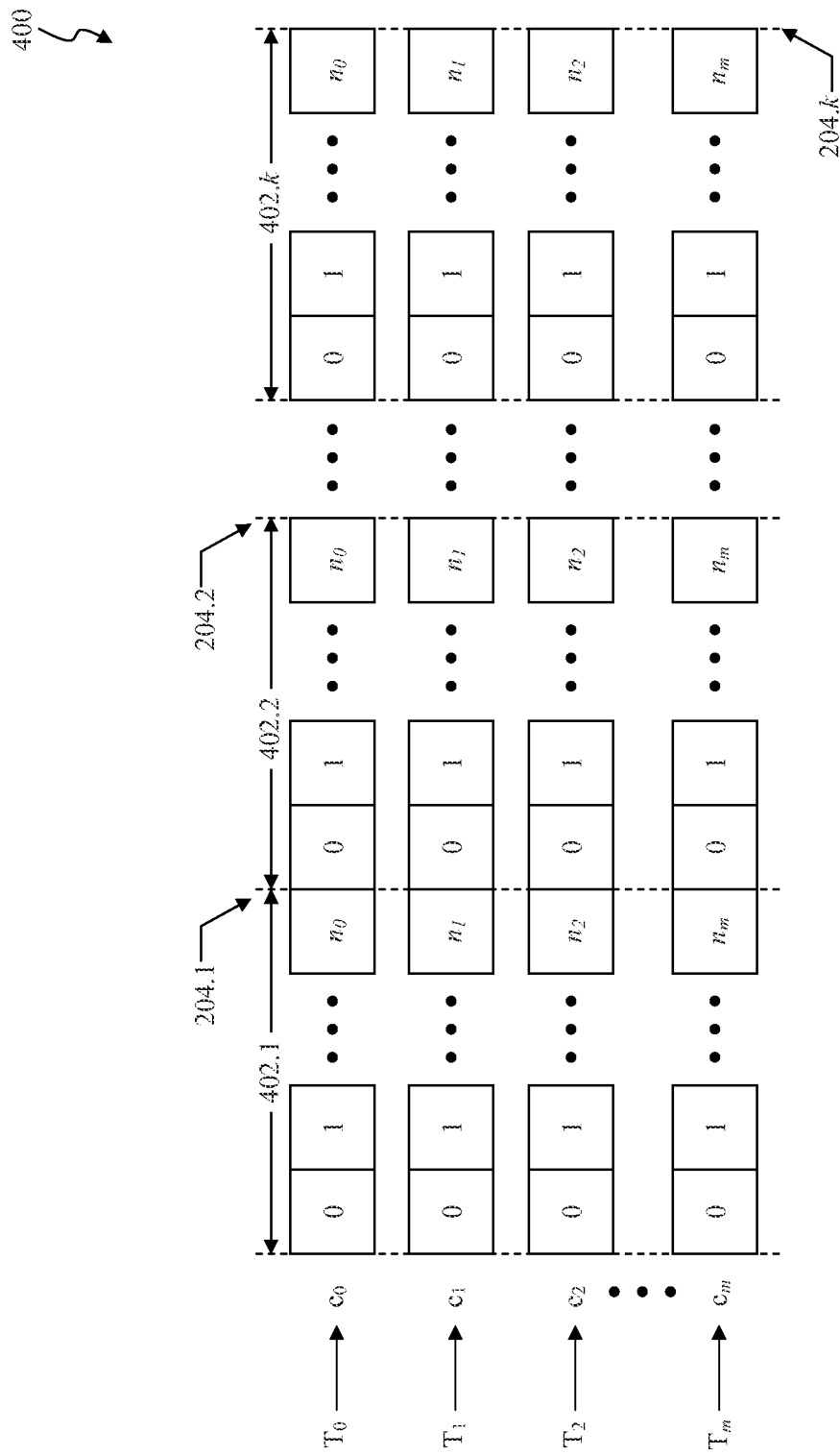
Figure 5:
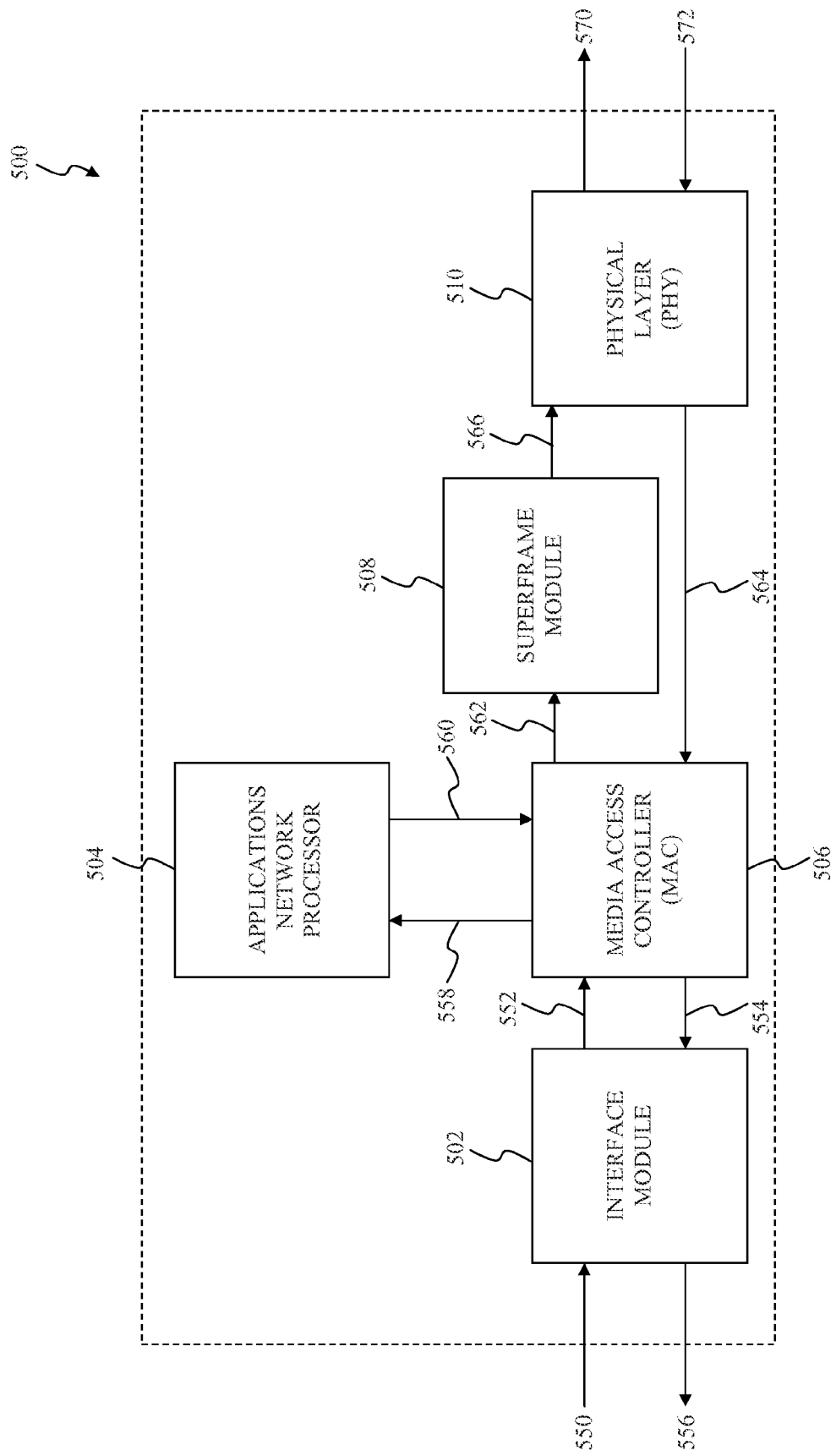
Figure 6:
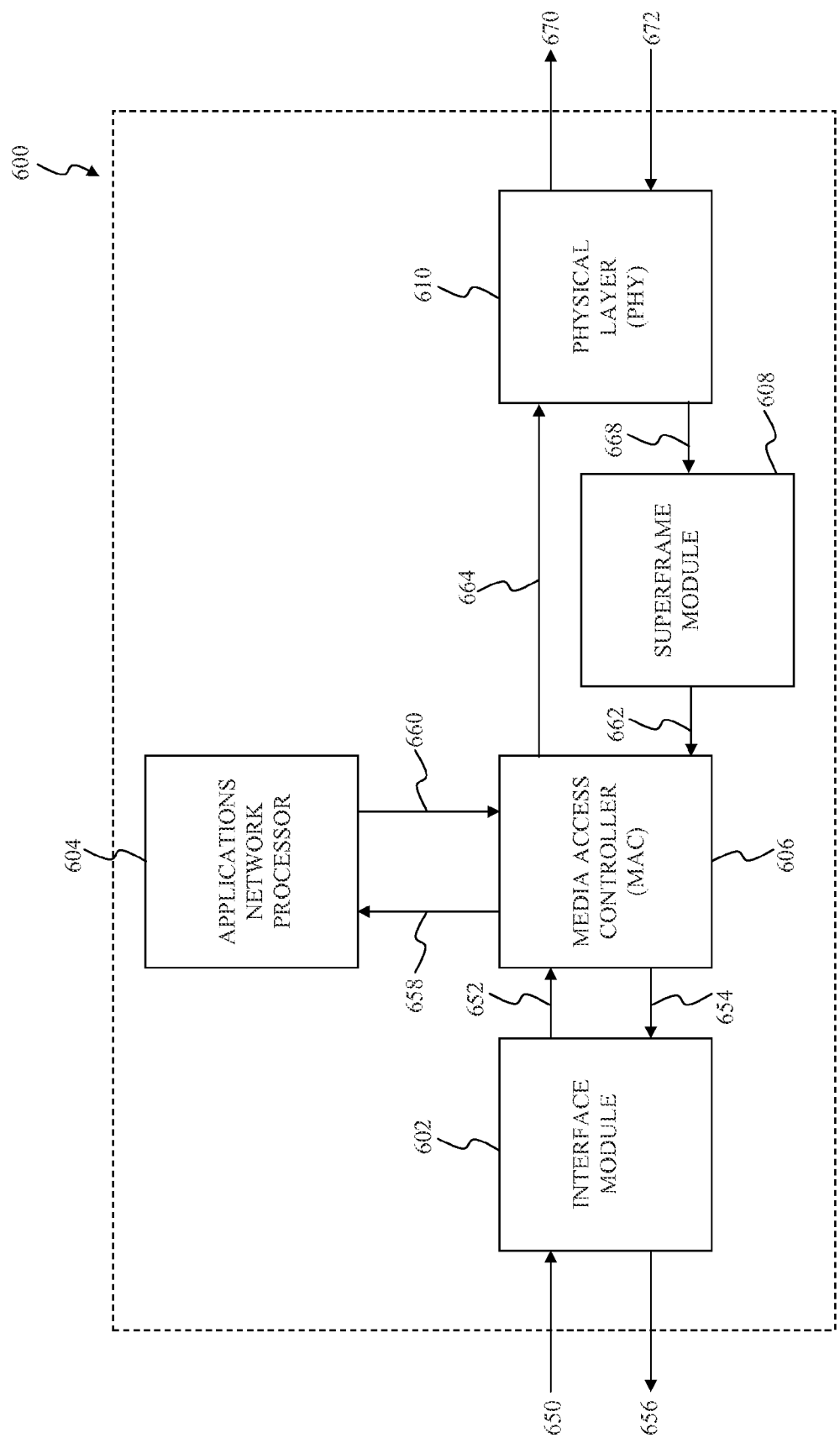

FIG. 1 illustrates a block diagram of an exemplary point-to-multipoint communication system according to an embodiment of the present disclosure;

FIG. 2A graphically illustrates a first super-frame arrangement for the upstream that may be used in the exemplary point-to-multipoint communication system according to an exemplary embodiment of the present disclosure;

FIG. 2B graphically illustrates a first continuous allocation of minislots of the first super-frame arrangement according to an exemplary embodiment of the present disclosure;

FIG. 2C graphically illustrates a second continuous allocation of minislots of the first super-frame arrangement according to an exemplary embodiment of the present disclosure;

FIG. 3 graphically illustrates a second super-frame arrangement for the upstream that may be used in the exemplary point-to-multipoint communication system according to an exemplary embodiment of the present disclosure;

FIG. 4 graphically illustrates a third super-frame arrangement for the upstream that may be used in the exemplary point-to-multipoint communication system according to an exemplary embodiment of the present disclosure;

FIG. 5 illustrates a block diagram of an exemplary cable modem that may be implemented as part of the point-to-multipoint communication system according to an embodiment of the present disclosure; and FIG. 6 illustrates a block diagram of an exemplary CMTS that may be implemented as part of the point-to-multipoint communication system according to an embodiment of the present disclosure.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the embodiments of the disclosure described herein refer specifically, and by way of example, to cable modem systems, including cable modem termination systems and cable modems, it will be readily apparent to persons skilled in the relevant art(s) that the disclosure is equally applicable to satellite systems, optical communications systems, telephone wire systems, home network systems, and/or any combination thereof. It will be readily apparent to persons skilled in the relevant art(s) that the disclosure is applicable to any point-to-multipoint system.

General Overview

The present disclosure describes systems, methods, and apparatuses that efficiently distribute data over multiple communications channels by numbering and framing minislots across multiple communication channels. The present disclosure presents these systems, methods, and apparatuses with a single stream of minislots, similar to the conventional single-channel system as described above, even though multiple communications channels are in use. The present disclosure also offers various manners in which to preserve independence of many PHY-layer parameters such as symbol or modulation rate, preamble length, minislot duration, modulation order, to provide some examples, so that PHY-layer parameters for each communication channel can be selected to best adapt for interference and/or distortion present on that communication channel.

Exemplary Communications System

FIG. 1 illustrates a block diagram of an exemplary point-to-multipoint communication system according to an embodiment of the present disclosure. A communications system 100 facilitates bi-directional communication of information, such as video, audio, and/or data to provide some examples, between a cable modem termination system (CMTS) 102 and cable modems 104.1 through 104.$n$ via a communications network 106, such as a hybrid fiber coaxial (HFC) cable network to provide an example. The CMTS 102 and the cable modems 104.1 through 104.$n$ communicate with each other using a bi-directional transfer of packet-based traffic, such as Internet Protocol (IP) traffic to provide an example. As used herein, the term "downstream" refers to the transfer of information in a first direction from the CMTS 102 to the cable modems 104.1 through 104.$n$. The term "upstream" refers to the transfer of information in a second direction from the cable modems 104.1 through 104.$n$ to the CMTS 102.

The CMTS 102 manages the upstream and the downstream transfer of the information between it and the cable modems 104.1 through 104.$n$. The CMTS 102 broadcasts information in the downstream to the cable modems 104.1 through 104.$n$ as a continuous transmitted signal in accordance with a time division multiplexing (TDM) technique. Additionally, the CMTS 102 receives information from the cable modems 104.1 through 104.$n$ over a plurality of upstream channels. The information from the cable modems 104.1 through 104.$n$ is transmitted in the upstream in accordance with a time domain multiple access (TDMA) technique and/or a synchronous code division multiple access (S-CDMA) technique. Further, the CMTS 102 operates as an interface between the HFC network 106 and a packet switched network 108 to transfer IP packets received from the cable modems 104.1 through 104.$n$ to the packet switched network 108 and to transfer IP packets received from the packet switched network 108 to the cable modems 104.1 through 104.$n$.

The HFC network 106 provides a point-to-multipoint topology for the high speed, reliable, and secure transport of information between the CMTS 102 and the cable modems 104.1 through 104.$n$. As will be appreciated by persons skilled in the relevant art(s), the HFC network 106 may include coaxial cable, fiber optic cable, or a combination of coaxial cable and fiber optic cable linked via one or more fiber nodes, and may include frequency translation devices in support of a frequency stacking architecture, and may even include wireless links.

The cable modems 104.1 through 104.$n$ operate as an interface between the HFC network 106 and user devices 110.1 through 110.$n$. The user devices 110.1 through 110.$n$ may represent one or more personal computers, data terminal equipment, one or more telephony devices, one or more broadband media players, one or more network controlled appliances, and/or other devices that are capable of transmitting and/or receiving data over a packet switched network. Specifically, the cable modems 104.1 through 104.$n$ convert signals received over the HFC network 106 in the downstream into IP data packets to be received by the user devices 110.1 through 110.$n$. Additionally, the cable modems 104.1 through 104.$n$ convert IP data packets received from the user devices 110.1 through 110.$n$ into signals suitable for transfer over the HFC network 106 in the upstream.

In an exemplary embodiment, the communications system 100 may utilize Data Over Cable Service Interface Specification (DOCSIS) compliant equipment and protocols, or portions thereof, to carry out the bi-directional transfer of information, such as video, audio, and/or data between the CMTS 102 and the cable modems 104.1 through 104.$n$. The DOCSIS Specification generally refers to a group of specifications published by CableLabs® that define industry standards for the CMTS 102 and the cable modems 104.1 through 104.$n$. In part, the DOCSIS specification sets forth requirements and objectives for various aspects of cable modem systems including operations support systems, management, data interfaces, as well as network layer, data link layer, and physical layer transport for data over cable systems. A DOCSIS cable system includes two primary components: one or more Set-top Devices, such as the cable modems 104.1 through 104.$n$ to provide an example, at a customer premises, and the CMTS 102 that is typically located at or within a headend.

Various superframe arrangements that efficiently distribute data over multiple communications channels are to be described in further detail below. Although not explicitly described, certain aspects and features of one superframe arrangements may be equally applicable to other superframe arrangements. For example, a first exemplary superframe arrangement, as to be described in FIG. 2A through FIG. 2C, is typically employed when most, if not all, of the communication channels have substantially similar characteristics. As another example, a second and a third superframe arrangements, as to be described in FIG. 3 and FIG. 4, is typically employed when characteristics differ between two or more communication channels. In both of the examples, the systems, methods, and apparatuses of the present disclosure effectively utilizes a single stream of minislots with a single numbering system for communication. In this single stream, minislots which are close in number are also close in time. The systems, methods, and apparatuses of the present disclosure advantageously no longer need to be concerned with multiple numbering schemes or with determining an order of bandwidth grants and ensuring bandwidth grants on different communication channels are not too far apart. Additionally, the systems, methods, and apparatuses of the present disclosure advantageously no longer need to be aware of which communication channels will be to used to distribute data.

Some of the systems, methods, and apparatuses divide data across multiple communication channels and/or superframes in accordance with one or more of the superframe arrangements to form the single stream of minislots. Other systems, methods, and apparatuses extract the data from the single stream of minislots in accordance with one or more of the superframe arrangements. Overall, the systems, methods, and apparatuses are simplified when compared to systems that conventionally distribute data due to a common, consistent, a priori understanding, of data distribution that is captured in the various superframe arrangements.

A First Exemplary Super-Frame Arrangement

FIG. 2A graphically illustrates a first super-frame arrangement for the upstream that may be used in the exemplary point-to-multipoint communication system according to an exemplary embodiment of the present disclosure. A CMTS, such as the CMTS 102 to provide an example, may cause cable modems, such as the cable modems 104.1 through 104.$n$ to provide an example, to configure and arrange their information for upstream transmission in a specialized manner to form a super-frame arrangement 200.

The super-frame arrangement 200 includes super-frames 202.1 through 202.$k$ that are separated from each other by corresponding super-frame boundaries 204.1 through 204.$k$. The super-frame boundaries 204.1 through 204.$k$ represent transitions between super-frames whereby one super-frame may be characterized as ending and another super-frame may be characterized as beginning. The super-frames 202.1 through 202.$k$ include communication channels $C_0$ through $C_m$ that are dedicated for upstream communication between the cable modems and the CMTS. The upstream communication channels $C_0$ through $C_m$ may occupy different portions of a physical spectrum allocated for upstream communication as shown in FIG. 2A, or, alternatively, may occupy substantially similar portions of the physical spectrum but are logically divisible. For example, the upstream communication channels $C_0$ through $C_m$ may represent time division multiple access (TDMA) communication channels which occupy different portions of the physical spectrum. In an exemplary embodiment, the communication channels $C_0$ through $C_m$ represent communication channels that are specified by the DOCSIS specification; however, those skilled in the relevant art(s) will recognize that the communication channels $C_0$ through $C_m$ may represent other types of standard specified communication channels and/or non-standard specified communication channels without departing from the spirit and scope of the present disclosure.

The communication channels $C_0$ through $C_m$ that occupy the super-frames 202.1 through 202.$k$ may be divisible into continuous, discrete intervals in time, referred to as minislots 0 through n. In an exemplary embodiment, the communication channels $C_0$ through $C_m$ are divisible into 16 minislots, each minislot from among the 16 minislots having a duration of approximately 6.25 pec. The super-frames 202.1 through 202.$k$ may be characterized as including (m+1)*(n+1) minislots. The (m+1)*(n+1) minislots may be horizontally and/or vertically indexed by a series of integer numbers that range from 0 to (m+1)*(n+1). These minislots may be of sufficient duration to include one or more bits, bytes, and/or symbols, such as one or more bits, bytes, and/or symbols of a data packet to provide an example. The data packet may include a payload and/or a header that may be forward error corrected, referred to as an information portion, and associated preamble and/or guard band, referred to as an overhead portion. In another exemplary embodiment, the discrete intervals in time may be of sufficient duration to include 32 symbols of information.

Typically, the information is transmitted from one of the cable modems to the CMTS using one or more minislots 0 through n corresponding to one or more communication channels $C_0$ through $C_m$ of one or more of the super-frames 202.1 through 202.$k$. For example, one or more bits, bytes, and/or symbols of the information may be transmitted using one or more minislots 0 through n corresponding to one of the communication channels $C_0$ through $C_m$ of one of the super-frames 202.1 through 202.$k$. As another example, the information may be transmitted using one or more minislots 0 through n corresponding to more than one of the communication channels $C_0$ through $C_m$ of one of the super-frames 202.1 through 202.$k$. As a further example, the information may be transmitted using one or more minislots 0 through n corresponding to more than one of the communication channels $C_0$ through $C_m$ of more than one of the super-frames 202.1 through 202.$k$.

To establish a communication, the CMTS receives requests for upstream bandwidth from the cable modems in the upstream. In an exemplary embodiment, the CMTS may receive these requests for upstream bandwidth in one or more of the minislots 0 through n of one or more of the communication channels $C_0$ through $C_m$ which are designated for such requests. Herein, the minislots of the super-frames 202.1 through 202.$k$ may be designated as minislots $C_{0,0}$ through $C_{m,n}$, wherein the first subscript designates one of the communication channels $C_0$ through $C_m$ and the second subscript designates one of the minislots 0 through n that corresponds to this communication channel.

The CMTS allocates the minislots $C_{0,0}$ through $C_{m,n}$ for use by the cable modems, referred to as upstream bandwidth grants, in response to the requests for upstream bandwidth in a continuous manner to effectively form a single stream of minislots. The CMTS provides this allocation as an upstream bandwidth allocation map message (MAP) to the CM in the downstream. In an exemplary embodiment, the CMTS provides a single MAP message to the CM with a bandwidth grant indicating starting and/or ending minislot numbers independent a number of the communication channels $C_0$ through $C_m$ that the bandwidth grant may span. Specifically, the CMTS allocates the minislots $C_{0,0}$ through $C_{0,n}$ that correspond to the communication channel $C_0$ in a sequential, continuous manner followed by the minislots $C_{1,0}$ through $C_{1,n}$ that correspond to the communication channel $C_1$ in the sequential, continuous manner. It should be noted that the allocation of the minislots by CMTS need not begin or end on one of the super-frame boundaries 204.1 through 204.$k$, but may start and end at any minislot on any of the communication channels $C_0$ through $C_m$. The CMTS allocates all of the minislots $C_{0,0}$ through $C_{m,n}$ of one super-frame from among the super-frames 202.1 through 202.$k$ in a substantially similar continuous manner. The CMTS repeats this continuous allocation to form another super-frame from among the super-frames 202.1 through 202.$k$. For example, the CMTS may receive a first request for upstream bandwidth from a first cable modem and a second request for upstream bandwidth from a second cable modem. In this example, the CMTS allocates a first continuous allocation of minislots from among the minislots $C_{0,0}$ through $C_{m,n}$ to accommodate the first request for upstream bandwidth followed by a second continuous allocation of minislots from among the minislots $C_{0,0}$ through $C_{m,n}$ to accommodate the second request for upstream bandwidth. In this situation, the second continuous allocation of minislots directly follows the first continuous allocation of minislots to form a single stream of continuous minislots. The first and the second continuous allocation may correspond to one or more of the communication channels $C_0$ through $C_m$ of one or more of the super-frames 202.1 through 202.$k$.

The continuous allocation of the minislots $C_{0,0}$ through $C_{m,n}$ may cause the upstream bandwidth grant to be spread across more than one of the communication channels $C_0$ through $C_m$. In this situation, the upstream bandwidth grant may include some of the minislots 0 through n corresponding to a first communication channel from among the communication channels $C_0$ through $C_m$ and some of the minislots 0 through n corresponding to a second communication channel from among the communication channels $C_0$ through $C_m$. However, this example is not limiting, those skilled in the relevant art(s) will recognize that bandwidth grant may be spread across any suitable number of communication channels from among the communication channels $C_0$ through $C_m$ without departing from the spirit and scope of the present invention.

FIG. 2B graphically illustrates a first continuous allocation of minislots of the first super-frame arrangement according to an exemplary embodiment of the present disclosure. A super-frame 250 includes communication channels $C_0$ through $C_{31}$, each of the communication channels $C_0$ through $C_{31}$ including 16 minislots for a total of 512 minislots. As shown in FIG. 2B, the 512 minislots are horizontally indexed by a series of integer numbers that range from 0 to 511. For example, the minislots 0 through 15 correspond to the communication channel $C_0$, the minislots 16 through 31 correspond to the communication channel $C_1$, and the minislots 496 through 511 correspond to the communication channel $C_{31}$. However, this example is not limiting, those skilled in the relevant art(s) will recognize that the super-frame 250 may include a different number of communication channels and/or minislots without departing from the spirit and scope of the present disclosure. The super-frame 250 may represent an exemplary embodiment of one of the super-frames 202.1 through 202.$k$.

Assuming a short data packet includes a 64 symbol payload and an 8 symbol header for a total of 72 symbols and 82 symbols if forward error corrected encoded using Reed-Solomon encoding with a shortened codeword. Also, assuming that the short data packet includes a 32 symbol preamble and a 5 symbol guard band, the short data packet, in its entirety, would be 119 symbols. The CMTS may allocate 4 minislots, when each minislot is of sufficient duration for 32 symbols, over one of the communication channels $C_0$ through $C_{31}$ in the super-frame 250 for the short data packet.

However, if there are insufficient minislots available in one communication channel from among the communication channels $C_0$ through $C_{31}$, the CMTS may allocate minislots over two communication channels from among the communication channels $C_0$ through $C_{31}$ for the short data packet. In this situation, there would be a second preamble and a second guard band on the second communication channel when the short data packet is split over two communication channels from among the communication channels $C_0$ through $C_{31}$. The short data packet would expand from 119 symbols to 156 symbols to accommodate the second preamble and the second guard band. In this situation, the CMTS allocates 5 minislots over two of the communication channels $C_0$ through $C_{31}$ in the super-frame 250 for the short data packet. Therefore, the transmission efficiency is reduced from approximately 64% to approximately 51% when the short data packet is split over two of the communication channels $C_0$ through $C_{31}$ in the super-frame arrangement 200. Further, there is approximately a 3 in 16 chance that the short data packet will be split over two of the communication channels $C_0$ through $C_{31}$, so on average, the efficiency of this short data packet is approximately 61%.

Referring back to FIG. 2A, this continuous allocation of the minislots $C_{0,0}$ through $C_{m,n}$ may additionally cause the upstream bandwidth grant to be spread across more than one of the super-frames 202.1 through 202.$k$. In this situation, the upstream bandwidth grant may include some of the minislots 0 through n corresponding to one or more communication channels $C_0$ through $C_m$ of a first super-frame from among the super-frames 202.1 through 202.$k$ and some of the minislots 0 through n corresponding to one or more communication channels $C_0$ through $C_m$ of a second super-frame from among the super-frames 202.1 through 202.$k$. However, this example is not limiting, those skilled in the relevant art(s) will recognize that bandwidth grant may be spread across any suitable number of super-frames from among the super-frames 202.1 through 202.$k$ without departing from the spirit and scope of the present invention.

FIG. 2C graphically illustrates a second continuous allocation of minislots of the first super-frame arrangement according to an exemplary embodiment of the present disclosure. A super-frame 254 and a super-frame 256 each include communication channels $C_0$ through $C_{31}$, each of the communication channels $C_0$ through $C_{31}$ including 16 minislots for a total of 512 minislots. As shown in FIG. 2B, the 512 minislots that correspond to the super-frame 254 and the super-frame 256 are horizontally indexed by a first series of integer numbers that range from 0 to 511 and a second series of integer numbers that range from 512 to 1023, respectively. For example, the minislots 0 through 15 correspond to the communication channel $C_0$ of the super-frame 254, the minislots 16 through 31 correspond to the communication channel $C_1$ of the super-frame 254, and the minislots 496 through 511 correspond to the communication channel $C_{31}$ of the super-frame 254. In this example, the minislots 512 through 527 correspond to the communication channel $C_0$ of the super-frame 256, the minislots 528 through 543 correspond to the communication channel $C_1$ of the super-frame 256, and the minislots 1008 through 1023 correspond to the communication channel $C_{31}$ of the super-frame 256. However, this example is not limiting, those skilled in the relevant art(s) will recognize that the super-frame 254 and the super-frame 256 may include a different number of communication channels and/or minislots without departing from the spirit and scope of the present disclosure. The super-frame 254 and super-frame 256 may represent exemplary embodiments of two of the super-frames 202.1 through 202.$k$.

Assuming a long data packet includes a 475 symbol payload, a 32 symbol preamble, and a 5 symbol guard band, the long data packet, in its entirety, would be 512 symbols. The CMTS may allocate 16 minislots, when each minislot is of sufficient duration for 32 symbols, over the communication channel $C_{31}$ corresponding to the super-frame 254 for the long data packet.

However, if the CMTS were to allocate minislots over the super-frame 254 and the super-frame 256, there would be a second preamble and a second guard band on the second communication channel. The long data packet would expand from 512 symbols to 549 symbols to accommodate the second preamble and the second guard band. In this situation, the CMTS allocates 18 minislots over the super-frame 254 and the super-frame 256. Therefore, the transmission efficiency is reduced from approximately 92% to approximately 82% when the long data packet is split over the super-frame 254 and the super-frame 256. Further, there is approximately a 15 in 16 chance that the long data packet will be split over the super-frame 254 and the super-frame 256, so on average, the efficiency of this long data packet is approximately 83%.

Referring back to FIG. 2A, this continuous allocation of the minislots $C_{0,0}$ through $C_{m,n}$ may further cause the upstream transmission from the one or more of the cable modems to be allocated across more than one of the communication channels $C_0$ through $C_m$ and more than one of the super-frames 202.1 through 202.$k$.

A Second Exemplary Super-Frame Arrangement of the Upstream

Ideally, the communication channels $C_0$ through $C_m$ have substantially similar information carrying capabilities. For example, the communication channels $C_0$ through $C_m$ may be used by one or more cables modems to communicate information at a substantially similar data rate, code rate, and/or modulation scheme. These substantially similar information carrying capabilities precisely align the super-frames 202.1 through 202.$k$ in time.

However, in practice, the communication channels $C_0$ through $C_m$ introduces interference and/or distortion into the information as it is being transferred to the CMTS. Typically, the interference and/or distortion may degrade a signal-tonoise ratio (SNR) of some of the communication channels $C_0$ through $C_m$, but not others. Noise, signal strength variations known as fading, phase shift variations, multiple path delays known as multi-path propagation or echoes among the communication channels $C_0$ through $C_m$ to provide some examples, may cause varying distortion that differs among the communication channels $C_0$ through $C_m$ to be impressed onto the information. For example, transmission over a multiplicity of paths of different and variable lengths, or rapidly varying delays in the communication channels $C_0$ through $C_m$ may cause a change in an amplitude and/or a phase response of some of the communication channels $C_0$ through $C_m$, but not others. Also, interference resulting from undesirable signals and/or noise may be impressed onto to the information by some of the communication channels $C_0$ through $C_m$, but not others.

FIG. 3 graphically illustrates a second super-frame arrangement for the upstream that may be used in the exemplary point-to-multipoint communication system according to an exemplary embodiment of the present disclosure. A CMTS, such as the CMTS 102 to provide an example, may cause cable modems, such as the cable modems 104.1 through 104.n to provide an example, to configure and arrange their information in a specialized manner to form a super-frame arrangement 300. The super-frame arrangement 300 shares many substantially similar features as the super-frame arrangement 200; therefore, only differences between the super-frame arrangement 200 and the super-frame arrangement 300 are to be discussed in further detail.

The super-frame arrangement 300 includes super-frames 302.1 through 302.k that are separated from each other by their corresponding super-frame boundaries 204.1 through 204.k. The super-frames 302.1 through 302.k include the communication channels $C_0$ through $C_m$ that may be divisible into the minislots 0 through n. The minislots $C_{0,0}$ through $C_{m,n}$ are approximately equal in duration; however, information carrying capabilities of the minislots $C_{0,0}$ through $C_{m,n}$ may differ between the communication channels $C_0$ through $C_m$. The minislots 0 through n corresponding to some of the communication channels $C_0$ through $C_m$ may be configured to communicate more information than minislots 0 through n corresponding to other communication channels $C_0$ through $C_m$.

The information carrying capabilities, such as data rates $R_0$ through $R_m$, of the communication channels $C_0$ through $C_m$, may be selected to precisely align their corresponding minislots 0 through n in time to compensate for the interference and/or the distortion that is impressed upon the information by the communication channels $C_0$ through $C_m$. For example, a first data rate from among data rates $R_0$ through $R_m$ the corresponds to a first communication channel from among the communication channels $C_0$ through $C_m$ may be greater than or less than a second data rate from among the data rates $R_0$ through $R_n$ that corresponds to a second communication channel from among the communication channels $C_0$ through $C_m$. In this example, the minislots 0 through n corresponding to the first communication channel may be used to communicate larger or smaller packets than the minislots 0 through n corresponding the second communication channel, however, the duration of the minislots 0 through n corresponding to the first and the second communication channels are approximately equal. Typically, those communication channels from among the communication channels $C_0$ through $C_m$ that encounter little to no interference and/or distortion may operate at a higher data rate when compared to other communication channels from among the communication channels $C_0$ through $C_m$ that encounter more interference and/or distortion.

The data rates $R_0$ through $R_n$ of the communication channels $C_0$ through $C_m$ may be selected by modulating the communication channels $C_0$ through $C_m$ using different modulation schemes, such as binary phase shift keying (BPSK), quadrature phase shift keying (QPSK) or quadrature amplitude modulating (QAM) to provide some examples, and/or using different symbol rates. The data rates $R_0$ through $R_n$ for the communication channels $C_0$ through $C_m$ may be expressed as a product of an order of the modulation scheme used by the communication channels $C_0$ through $C_m$, typically expressed in bits per symbol, and a symbol rate of the communication channels $C_0$ through $C_m$, typically expressed in symbols per second. Those communication channels from among the communication channels $C_0$ through $C_m$ that encounter little to no interference and/or distortion may use a higher order modulation scheme and/or a higher symbol rate when compared to other communication channels from among the communication channels $C_0$ through $C_m$ that encounter more interference and/or distortion. These communication channels $C_0$ through $C_m$ that encounter more interference and/or distortion may use a lower order modulation scheme and/or a lower symbol rate.

In an exemplary embodiment, bandwidths of the communication channels $C_0$ through $C_m$ may be increased and/or decreased to accommodate their symbol rates. This is particular useful in avoiding narrow band interference that may occupy substantially similar spectrum of one or more of the communication channels $C_0$ through $C_m$. Additionally, a center frequency of the communication channels $C_0$ through $C_m$ may be shifted to accommodate the bandwidths of the communication channels $C_0$ through $C_m$. For example, if a narrow band interference, such as a radar to provide an example, is interfering with a portion of the communication channel $C_0$, a bandwidth of the communication channel $C_0$ may be reduced and shifted to avoid the narrow band interference. In this situation, a center frequency of the communication channel $C_0$ may also be shifted appropriately to be approximately centered within this reduced bandwidth.

Additionally, characteristics, such as communication efficiency, of the information may be selected to compensate for the interference and/or the distortion that is impressed upon the communication channels $C_0$ through $C_m$. For example, a size of a preamble appended to an information payload and/or a guard time between packets may be varied and the effect of this variation increases and/or decreases the communication efficiency of the communication channels $C_0$ through $C_m$. For example, those communications channels from among the communication channels $C_0$ through $C_m$ that encounter more interference and/or distortion may typically be characterized as having larger preambles appended to their information payloads and/or increased guard time between packets when compared to other communication channels from among the communication channels $C_0$ through $C_m$ that encounter less interference and/or distortion. It may be desirable to have substantially equal durations of preambles and/or guard time on each of the communication channels $C_0$ through $C_m$ to simplify overhead calculations. Those communication channels from among the communication channels $C_0$ through $C_m$ that encounter little to no interference and/or distortion may have a lesser communication efficiency by including larger preambles appended to their information payloads and/or an increased guard time between packets when compared to other communication channels from among the communication channels $C_0$ through $C_m$ that encounter more interference and/or distortion. From the example above, the communication efficiency of those communication channels $C_0$ through $C_m$ that encounter less interference and/or distortion is reduced by including the larger preambles and/or the increased guard time to effectively equalize the preambles and/or guard time on each of the communication channels $C_0$ through $C_m$ to simplify overhead calculations.

A Third Exemplary Super-Frame Arrangement of the Upstream

FIG. 4 graphically illustrates a third super-frame arrangement for the upstream that may be used in the exemplary point-to-multipoint communication system according to an exemplary embodiment of the present disclosure. A CMTS, such as the CMTS 102 to provide an example, may cause cable modems, such as the cable modems 104.1 through 104.n to provide an example, to configure and arrange their information in a specialized manner to form a super-frame arrangement 400. The super-frame arrangement 400 shares many substantially similar features as the super-frame arrangement 200; therefore, only differences between the super-frame arrangement 200 and the super-frame arrangement 400 are to be discussed in further detail.

The super-frame arrangement 400 includes super-frames 402.1 through 402.k that are separated from each other by their corresponding super-frame boundaries 204.1 through 204.k. The super-frames 402.1 through 402.k include the communication channels $C_0$ through $C_m$ that may be divisible into the minislots 0 through n. The amount of information communicated by the minislots $C_{0,0}$ through $C_{m,n}$ is substantially similar; however, the duration of the minislots $C_{0,0}$ through $C_{m,n}$ may differ to accommodate different information carrying capabilities of the communication channels $C_0$ through $C_m$. As a result, the communication channels $C_0$ through $C_m$ may include a different number of minislots 0 through n depending upon their information carrying capabilities. Often, the different number of the minislots 0 through n requires a non-power of two number of symbols per minislot for the communication channels $C_0$ through $C_m$.

As shown in FIG. 4, the communication channel $C_0$ includes minislots 0 through $n_0$, each of the minislots 0 through $n_0$ having a duration of $T_0$. Likewise, the communication channel $C_1$ includes minislots 0 through $n_1$, each of the minislots 0 through $n_1$ having a duration of $T_1$. Similarly, the communication channel $C_m$ includes minislots 0 through $n_m$, each of the minislots 0 through $n_m$ having a duration of $T_m$. The durations $T_0$ through $T_m$ may be similar or different from each other depending upon the information carrying capabilities of the communication channels $C_0$ through $C_m$; however, an amount of information communicated by each of the minislots 0 through n for each of the communication channels $C_0$ through $C_m$ is substantially similar.

Although the discussion of FIG. 2A through FIG. 4 has been directed toward communication channels $C_0$ through $C_m$ that occupy different portions of the physical spectrum, such as TDMA to provide an example, those skilled in the relevant art(s) will recognize that the teachings herein may be applied to logically divisible communication channels, such as S-CDMA to provide an example, without departing from the spirit and scope of the present disclosure. For example, the upstream communication channels $C_0$ through $C_m$ may represent synchronous code division multiple access (S-CDMA) communication channels that occupy substantially similar portions of the physical spectrum but are logically divisible by different codewords.

An Exemplary Cable Modem that May Use One or More of the Exemplary Super-Frame Arrangements FIG. 5 illustrates a block diagram of an exemplary cable modem that may be implemented as part of the point-to-multipoint communication system according to an embodiment of the present disclosure. A cable modem 500 receives information, such as video, audio, and/or data, from a CMTS, such as the CMTS 102 to provide an example, in the downstream and provides information to the CMTS in the upstream. The cable modem 500 configures and arranges the information for upstream transmission to the CMTS in accordance with a super-frame arrangement, such as the super-frame arrangement 200, the super-frame arrangement 300, and/or the super-frame arrangement 400 to provide some examples. The cable modem 500 includes an interface module 502, an applications network processor 504, a media access controller (MAC) 506, a super-frame module 508, and a physical layer (PHY) 510. The cable modem 500 may represent an exemplary embodiment of one or more of the cable modems 104.1 through 104.n.

The interface module 502 provides an external and/or internal interface between the MAC 506 and other peripheral components that are communicatively coupled to the cable modem 500. These other peripheral components may be incorporated within or coupled to the cable modem 500 and may include a machine-readable medium, such as a read only memory (ROM); a random access memory (RAM); a magnetic disk storage media; an optical storage media; a flash memory device; a computing device such as a personal, a laptop, or a desktop computer, a computer peripheral such as a printer, and/or any other suitable electronic device that will be apparent to those skilled in the relevant art(s) without departing from the spirit and scope of the disclosure.

The other peripheral components that are communicatively coupled to the cable modem 500 provide a sequence of peripheral data 550 to the interface module 502. Likewise the interface module 502 module provides a sequence of peripheral data 556 to these other peripheral components. The interface module 502 may operate upon the sequence of peripheral data 550 and/or a sequence of MAC data 554 to provide a sequence of interface data 552 that is suitable for use by the MAC 506 and/or the sequence of interface data 556, respectively. For example, the interface module 502 may format the sequence of peripheral data 550 and/or the sequence of MAC data 554 into frames having frame delimiters to indicate a start and/or an end of each of the frames. As another example, the interface module 502 may convert the sequence of peripheral data 550 and/or sequence of MAC data 554 from a first format, such as Ethernet to provide an example, to a second format that is suitable for use by the MAC 506.

Commonly, one or more applications, such as a telephony application, a network traffic routing application, a web browsing application, and/or a home gateway application to provide some examples, may be integrated within the cable modem 500. The applications network processor 504 may perform one or more of these applications using hardware, firmware, software, or any combination thereof. For example, one or more of these applications may be implemented as instructions stored on a machine-readable medium, which may be read and executed by one or more processors. The applications network processor 504 may receive a sequence of MAC data 558 for use by one or more of these applications and/or provide a sequence of application data 560 to the MAC 506 in response to performing one or more of these applications.

The media access controller (MAC) 506 establishes communications between the cable modem 500 and the CMTS.

For example, the MAC 506 provides a request for upstream bandwidth to the CMTS to transmit information in the upstream and receives an upstream bandwidth grant from the CMTS in an upstream bandwidth allocation map message (MAP) in the downstream. Typically, the MAP specifies one or more continuous minislots that correspond to one or more communication channels of one or more super-frames of the super-frame arrangement. As another example, the MAC transmits and/or receives MAC management messages for a variety of purposes, such as ranging requests and responses to provide some examples.

The MAC 506 additionally performs analog and/or digital signal processing upon information within the cable modem 500. The MAC 506 may operate upon the sequence of peripheral data 552 and/or the sequence of application data 560 to provide a sequence of MAC data 562 that is suitable for use by the super-frame module 508. Typically, the sequence of MAC data 562 is of sufficient duration to utilize the one or more continuous minislots as specified in the MAP message. For example, the MAC 506 formats the sequence of peripheral data 552 and/or the sequence of application data 560 for transmission to the CMTS. The formatting may include forward error correcting (FEC), such as a block encoding scheme, such as Reed-Solomon decoding, and/or a convolutional encoding scheme, such as the Viterbi algorithm, to provide some examples, concatenation, and/or payload header suppression. The formatting may also include fragmentation, such as fragmentation of the sequence of peripheral data 552 and/or the sequence of application data 560 to accommodate the upstream bandwidth grant in accordance with the MAP. For example, the MAC 506 determines the information carrying capabilities, such as data rate, code rate, and/or modulation scheme to provide some examples, of the minislots allocated to the cable modem 500 by the MAP. In this example, the MAC 506 fragments the sequence of peripheral data 552 and/or the sequence of application data 560 into one or more fragments based upon the information carrying capabilities of the continuous minislots allocated to the cable modem 500. The formatting may further include converting the sequence of peripheral data 552 and/or the sequence of application data 560 from a first format, such as Internet Protocol (IP) or Ethernet packets to provide an example, to a second format, such as DOCSIS to provide an example, which is suitable for transmission to the CMTS.

The MAC 506 may operate upon a sequence of PHY data 564 to provide the sequence of MAC data 558 that is suitable for the applications network processor 504 and/or the sequence of MAC data 554 that is suitable for the interface module 502. For example, the MAC 506 formats the sequence of PHY data 564 for delivery to the interface module 502 and/or the applications network processor 504. The formatting may include forward error correcting (FEC), such as a block decoding scheme, such as Reed-Solomon decoding, and/or a convolutional decoding scheme, such as the Viterbi algorithm, to provide some examples, de-concatenation, and/or payload header expansion. The formatting may also include defragmentation, such as defragmentation of the sequence of PHY data 564 into packets for delivery to the interface module 502 and/or the applications network processor 504. The formatting may further include converting the sequence of PHY data 564 from a first format, such as DOCSIS to provide an example, to a second format, such as Internet Protocol (IP) or Ethernet to provide some examples, that is suitable for the interface module 502 and/or the applications network processor 504.

The super-frame module 508 may be characterized as being a convergence layer between the MAC 506 and the PHY 510. Specifically, the super-frame module 508 configures and arranges the sequence of MAC data 562 in one of the super-frame arrangement 200, the super-frame arrangement 300, and/or the super-frame arrangement 400 in accordance with the MAP to provide a sequence of super-frame data 566.

For example, the MAP may allocate a first set of minislots from among the continuous minislots corresponding to a first communication channel and a second set of minislots from among the continuous minislots corresponding to a second communication channel to the MAC 506. The super-frame module 508 fragments the MAC data 562 into a first fragment that corresponds to the first set of minislots and a second data fragment that corresponds to the second set of minislots. The super-frame module 508 attaches a preamble and/or a guard band to the first and the second fragment and provides these fragments to the PHY 510 as the sequence of super-frame data 566. As another example, the MAP may allocate a first set of minislots corresponding from among the continuous minislots to a first super-frame and a second set of minislots from among the continuous minislots corresponding to a second super-frame to the MAC 506. The super-frame module 508 fragments the MAC data 562 into a first fragment that corresponds to the first set of minislots of the first super-frame and a second data fragment that corresponds to the second set of minislots of the second super-frame. The super-frame module 508 attaches a preamble and/or a guard band to the first and the second fragment and provides these data fragments to the PHY 510 as the sequence of super-frame data 566.

Additionally, the super-frame module 508 may buffer or delay the fragments such that they correspond, in time, with the continuous minislots of the MAP. For example, the super-frame module 508 may delay a first portion of the fragment such that it corresponds, in time, with a first set of minislots from among the continuous minislots corresponding to a first communication channel and a second portion of the one or more data sequences such that it corresponds, in time, with a second set of minislots from among the continuous minislots corresponding to a second communication channel. For example, if the first set of minislots begin at minislot $C_{0,n}$ and the second set of minislots ends at minislot $C_{1,0}$, the first portion of the fragment that is being transmitted using the first set of minislots is slightly delayed in time relative to the second fragment that is being transmitted using the second set of minislots.

The PHY 510 provides an interface between the CMTS and the cable modem 500. The PHY 510 may convert the sequence of super-frame data 566 from a digital representation to an analog representation. After this conversion, if performed, the PHY 510 modulates the sequence of super-frame data 566 onto a carrier wave using any suitable analog or digital modulation scheme to provide a transmitted communication sequence 570 in accordance with the sequence of MAC data 562 in one of the super-frame arrangement 200, the super-frame arrangement 300, and/or the super-frame arrangement 400. The suitable analog or digital modulation scheme may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation scheme that will be apparent to those skilled in the relevant art(s). Alternatively, the PHY 510 may modulate and/or encode the sequence of super-frame data 566 according to a multiple access transmission scheme such as code division multiple access (CDMA), synchronous CDMA (S-CDMA), frequency division multiple access (FDMA), time division multiple access (TDMA), discrete multi-tone (DMT) modulation, orthogonal frequency division multiple access (OFDMA) and/or any other suitable multiple access scheme that will be apparent by those skilled in the relevant art(s). In an exemplary embodiment, the PHY 510 modulates each of the communications channel of the super-frame arrangement independently of other communication channels of the super-frame arrangement. In this exemplary embodiment, the PHY 510 includes multiple PHYs to independently modulate the communications channels of the super-frame arrangement.

For example, the MAP may allocate continuous set of minislots that includes a first set of minislots corresponding to a first communication channel and a second set of minislots corresponding to a second communication channel to the MAC 506. The PHY 510 modulates a first portion of the sequence of super-frame data 566 onto the first communication channel in accordance with a first modulation scheme as specified by the super-frame arrangement and a second portion of the sequence of super-frame data 566 onto the second communication channel in accordance with a second modulation scheme as specified by the super-frame arrangement. The first modulation scheme and the second modulation scheme are typically specified by the super-frame arrangement and may be similar or different modulation schemes.

The PHY 510 demodulates a received communication signal 572 using any suitable analog or digital modulation scheme to provide the sequence of PHY data 564. The suitable analog or digital modulation scheme may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation scheme that will be apparent to those skilled in the relevant art(s). Alternatively, the PHY 510 may demodulate and/or decode the received communication signal 572 according to a multiple access transmission scheme such as code division multiple access (CDMA), synchronous CDMA (S-CDMA), frequency division multiple access (FDMA), time division multiple access (TDMA), discrete multi-tone (DMT) modulation, orthogonal frequency division multiple access (OFDMA) and/or any other suitable multiple access scheme that will be apparent by those skilled in the relevant art(s). The PHY 510 may additionally convert the received communication signal 572 from an analog representation to a digital representation before and/or after demodulation of the received communication signal 572.

An Exemplary Cmts that May Use One or More of the Exemplary Super-Frame Arrangements FIG. 6 illustrates a block diagram of an exemplary CMTS that may be implemented as part of the point-to-multipoint communication system according to an embodiment of the present disclosure. A CMTS 600 provides information, such as video, audio, and/or data, to cable modems, such as the cable modems 104 to provide an example, in the downstream and receives information from the cable modems in the upstream. The CMTS 600 configures and arranges the information to be transmitted from the modems in accordance with a super-frame arrangement, such as the super-frame arrangement 200, the super-frame arrangement 300, the super-frame arrangement 400 and/or any combination thereof to provide some examples. Specifically, the CMTS 600 receives a request for upstream bandwidth from the cable modems, allocates upstream bandwidth to the cable modems in accordance with the super-frame arrangement, and provides a MAP in the downstream to the cable modems indicating bandwidth grant to the cable modems. The CMTS 600 includes an interface module 602, an applications network processor 604, a media access controller (MAC) 606, a super-frame module 608, and a physical layer (PHY) 610. The CMTS 600 may represent an exemplary embodiment of the CMTS 102.

The interface module 602 provides an external and/or internal interface between the MAC 606 and a packet switched network, such as the packet switched network 108 to provide an example. The packet switched network provides a sequence of network data 650 to the interface module 602. Likewise the interface module 602 module provides a sequence of network data 656 to the packet switched network. The interface module 602 may operate upon the sequence of network data 650 and/or a sequence of MAC data 654 to provide a sequence of interface data 652 that is suitable for use by the MAC 606 and/or the sequence of interface data 666, respectively. The interface module 602 performs various functions that are substantially similar to the interface module 502 and will not be described in further detail.

The applications network processor 604 may receive a sequence of MAC data 658 for use by one or more applications and/or provide a sequence of application data 660 to the MAC 606 in response to performing one or more of these applications. Typically, the applications network processor 604 performs various functions that are different from those performed by the applications network processor 504; however, the applications network processor 504 and the applications network processor 604 may share similar functionality. The applications network processor 604 may provide functions relating to network forwarding and routing; video transcoding or repackaging; communicating with an operator Network Management System for status reporting and command execution, network resource allocation, higher-layer packet processing and/or control functions to provide some examples.

The media access controller (MAC) 606 establishes communications between the CMTS 600 and the cable modems. For example, the MAC 606 schedules upstream transmission opportunities in accordance with the super-frame arrangement for the cable modems. Specifically, the MAC 606 receives a request for upstream bandwidth from the cable modems. Typically, the MAC 606 receives the request for upstream bandwidth from one or more minislots of the super-frame arrangement that are dedicated for use by the cable modems for requesting bandwidth and/or a variety of other purposes, such as ranging requests to provide an example. In an exemplary embodiment, these minislots represent contention minislots that are capable of being used by the cable modems to provide requests for upstream bandwidth.

The MAC 606 allocates one or more minislots that corresponds to one or more communication channels of one or more super-frames of the super-frame arrangement to be used by the cable modems based upon the requests for upstream bandwidth. Specifically, the MAC 606 determines a number of minislots needed to accommodate the requests for upstream bandwidth from the cable modems. The MAC 606 determines a capacity, typically in bits, bytes, and/or symbols, for the upstream bandwidth that is requested by each of the cable modems. The MAC 606 determines a number of minislots corresponding to one or more communication channels of one or more super-frames of the super-frame arrangement that are needed to accommodate the capacity. In some conventional systems, such as those specified by the DOCSIS standard to provide an example, the capacity of a minislot is constant within a given continuous allocation of minislots. However, the capacity of the minislots of the super-frame may differ based upon information carrying capabilities, such as data rate, code rate, and/or modulation scheme to provide some examples, of the minislots of the super-frame arrangement.

In an exemplary embodiment, the MAC 606 may determine the number of minislots that are needed to accommodate the capacity using an information capacity table that is stored within the CMTS 600 and/or the cable modems. However, this example is not limiting, those skilled in the relevant art(s) will recognize that the MAC 606 may determine the number of minislots using any other suitable manner without departing from the spirit and scope of the present invention. For example, the MAC 606 may utilize a modulus operation in accordance with the indexing of the minislots to determine the number of minislots that are needed to accommodate the capacity.

Generally, the information capacity table is represents an indexing of the minislots for one or more communication channels of one or more super-frames and their raw capacity in bits, bytes, and/or symbols. The raw capacity of the minislots represents their overall capacity, or size, typically, expressed in bits, bytes, and/or symbols. As an example, TABLE 1 demonstrates an exemplary information capacity table of minislots 0 through 7 of a first communication channel $C_0$ and minislots 8 through 15 of a second communication channel $C_1$. In this example, the minislots 0 through 7 each have a capacity of 32 bytes that corresponds to 256-QAM and the minislots 8 through 15 each have a capacity of 24 bytes that corresponds to 64-QAM.

TABLE 1

EXEMPLARY INFORMATION CAPACITY TABLE

| MINISLOT NUMBER | COMMUNICATION CHANNEL | INDEX |
|---|---|---|
| 0 | $C_0$ | 32 |
| 1 | $C_0$ | 64 |
| 2 | $C_0$ | 96 |
| 3 | $C_0$ | 128 |
| 4 | $C_0$ | 160 |
| 5 | $C_0$ | 192 |
| 6 | $C_0$ | 224 |
| 7 | $C_0$ | 256 |
| 8 | $C_1$ | 280 |
| 9 | $C_1$ | 304 |
| 10 | $C_1$ | 328 |
| 11 | $C_1$ | 352 |
| 12 | $C_1$ | 376 |
| 13 | $C_1$ | 400 |
| 14 | $C_1$ | 424 |
| 15 | $C_1$ | 448 |

As shown in TABLE 1, a raw capacity of a bandwidth grant in bytes may be determined by looking up a first index value for a corresponding minislot number before the bandwidth grant is to begin and a second index value for a corresponding minislot number in which the bandwidth grant is to end and subtracting the first index value from the second index value. As an example, if a bandwidth grant is to occupy minislots 2 through 4, the first index value is 64 bytes corresponding to minislot 1 and the second index value is 160 bytes corresponding to minislot 4 which corresponds to a raw capacity of 96 bytes for the bandwidth grant.

In some circumstances, the raw capacity of the bandwidth grant is extended by the MAC 606 beyond the capacity of the request for upstream bandwidth to accommodate for overhead, such as preamble and/or guard to provide some examples, that results from the super-frame arrangement. In an exemplary embodiment, the MAC 606 may determine the preamble and guard that is needed to accommodate the super-frame arrangement using an overhead capacity table that is stored within the CMTS 600 and/or the cable modems.

As an example, TABLE 2 demonstrates an exemplary overhead capacity table for communication channel $C_0$ through communication channel $C_2$. In this example, the communication channel $C_0$ uses a 32 byte preamble and a 5 byte guard which is typical for 256-QAM. The communication channel $C_1$ uses a 12 byte preamble and a 6 byte guard which is typical for using 64-QAM. The communication channel $C_2$ uses a 12 byte preamble and a 6 byte guard which is typical for 16-QAM.

TABLE 2

EXEMPLARY OVERHEAD CAPACITY TABLE

| COMMUNICATION CHANNEL | PREAMBLE BYTES | GUARD BYTES |
|---|---|---|
| $C_0$ | 32 | 5 |
| $C_1$ | 44 | 11 |
| $C_2$ | 52 | 15 |

As shown in TABLE 2, an overhead capacity of a bandwidth grant in bytes may be determined by looking up a first preamble and guard value for a corresponding communication channel that corresponds to a first minislot of the bandwidth grant and a second preamble and guard value for a corresponding communication channel that corresponds to a second minislot of the bandwidth grant and subtracting the first preamble and guard value from the second preamble and guard value. Typically, the communication channel that corresponds to the first minislot and the second minislot may be determined from the information capacity table such as TABLE 1 to provide an example. Those skilled in the relevant art(s) will recognize that various values as shown in TABLE 1 and TABLE 2 are shown for illustratively purposes only, those skilled in the relevant art(s) will recognize that other values may be possible without departing from the spirit and scope of the present disclosure.

As an example, assuming the MAC 606 is to allocate minislots 2 through 10 of raw capacity to accommodate a request for upstream bandwidth. In this example, the preamble and the guard in bytes may be determined by looking up a first preamble and guard value for the communication channel $C_1$ corresponds to minislot 2 from the information capacity table and a second preamble and guard value for the communication channel $C_1$ that corresponds to minislot 10 and subtracting the first preamble and guard value from the second preamble and guard value to result in 8 bytes for the preamble and 6 bytes for the guard.

The MAC 606 communicates the upstream bandwidth grants to the cable modems as a MAP. The MAP may include an identifier for each of the cable modems and its corresponding upstream bandwidth grant, typically a range of minislot numbers, in the super-frame arrangement.

The MAC 606 additionally performs analog and/or digital signal processing upon the sequence of peripheral data 652 and/or the sequence of application data 660 to provide a sequence of MAC data 664 that is suitable for use by the PHY 610 in a substantially similar manner as the MAC 506 and will not be described in further detail. The MAC 606 may also operate upon a sequence of super-frame data 662 to provide the sequence of MAC data 658 that is suitable for the applications network processor 604 and/or the sequence of MAC data 654 that is suitable for the interface module 602 in a substantially similar manner as the MAC 506 and will not be described in further detail.

The super-frame module 608 may be characterized as being a convergence layer between the MAC 606 and the PHY 610. Specifically, the super-frame module 608 configures and arranges a sequence of PHY data 668 from the super-frame arrangement to provide the sequence of super-frame data 662. The super-frame module 608 combines the sequence of PHY data 668 in accordance with the MAP to provide the sequence of super-frame data 662. The super-frame module 608 may remove a preamble and/or a guard from the sequence of PHY data 668 where appropriate.

For example, the MAP may allocate a continuous set of minislots that includes a first set of minislots corresponding to a first communication channel and a second set of minislots corresponding to a second communication channel to the cable modems. The super-frame module 608 combines a first data sequence that corresponds to the first set of minislots and the second data sequence that corresponds to the second set of minislots and, optionally, removes any associated preamble and/or guard, to provide the sequence of super-frame data 662.

The PHY 610 provides an interface between the CMTS 600 and the cable modems. The PHY 610 may convert sequence of PHY data 664 from an analog representation to a digital representation. After this conversion, if performed, the PHY 610 modulates the sequence of PHY data 664 onto a carrier wave using any suitable analog or digital modulation scheme to provide a transmitted communication sequence 670. The suitable analog or digital modulation scheme may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation scheme that will be apparent to those skilled in the relevant art(s). Alternatively, the PHY 610 may modulate and/or encode the sequence of PHY data 664 according to a multiple access transmission scheme such as code division multiple access (CDMA), synchronous CDMA (S-CDMA), frequency division multiple access (FDMA), time division multiple access (TDMA), discrete multi-tone (DMT) modulation, orthogonal frequency division multiple access (OFDMA) and/or any other suitable multiple access scheme that will be apparent by those skilled in the relevant art(s).

The PHY 610 demodulates a received communication signal 672 using any suitable analog or digital modulation scheme to provide sequence of PHY data 668. The suitable analog or digital modulation scheme may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation scheme that will be apparent to those skilled in the relevant art(s). Alternatively, the PHY 610 may demodulate and/or decode the received communication signal 672 according to a multiple access transmission scheme such as code division multiple access (CDMA), synchronous CDMA (S-CDMA), frequency division multiple access (FDMA), time division multiple access (TDMA), discrete multi-tone (DMT) modulation, orthogonal frequency division multiple access (OFDMA) and/or any other suitable multiple access scheme that will be apparent by those skilled in the relevant art(s). The PHY 610 may additionally convert the received communication signal 672 from an analog representation to a digital representation before and/or after demodulation of the received communication signal 672.

CONCLUSION

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A cable modem for transmitting a sequence of data in accordance with a super-frame arrangement, the super-frame arrangement being characterized by a continuous sequence of minislots spread over a first communication channel and a second communication channel from among a plurality of communication channels, the cable modem comprising:
   a super-frame module configured to:
      arrange a first portion of the sequence of data onto a first set of minislots, corresponding to the first communication channel, from among the continuous sequence of minislots, and
      arrange a second portion of the sequence of data onto a second set of minislots, corresponding to the second communication channel, from among the continuous sequence of minislots; and
   a physical layer (PHY) configured to:
      transmit the first set of minislots over the first communication channel, and
      transmit the second set of minislots over the second communication channel.

2. The cable modem of claim 1, wherein the continuous sequence of minislots is further spread over a first super-frame from among a plurality of super-frames and a second super-frame from among the plurality of super-frames, wherein the first set of minislots is part of the first super-frame, and wherein the second set of minislots is part of the second super-frame.

3. The cable modem of claim 1, wherein information carrying capabilities of the first set of minislots and information carrying capabilities of the second set of minislots comprise:
   a data rate;
   a code rate; or
   a modulation scheme.

4. The cable modem of claim 1, wherein the super-frame module is further configured to:
   append a first preamble and a first guard band to the first portion of the sequence of data; and
   append a second preamble and a second guard band to the second portion of the sequence of data.

5. The cable modem of claim 1, further comprising:
   a Media Access Controller (MAC) configured to fragment the sequence of data into the first portion and the second portion in accordance with a bandwidth allocation, the bandwidth allocation specifying the continuous sequence of minislots to be used for transmission.

6. The cable modem of claim 5, wherein the MAC is further configured to:
fragment the sequence of data into the first portion and the second portion based on information carrying capabilities of the first set of minislots and the second set of minislots, respectively.

7. A cable modem termination system (CMTS) for receiving a sequence of data in accordance with a super-frame arrangement, the super-frame arrangement being characterized by a continuous sequence of minislots, spread over a first communication channel and a second communication channel from among a plurality of communication channels, the CMTS comprising:
a physical layer; and
a Media Access Controller (MAC) configured to:
receive a first request for upstream bandwidth and a second request for upstream bandwidth,
allocate a first set of minislots, from among the continuous, sequence of minislots, over the first communication channel having a first portion of the sequence of data to accommodate the first request, and
allocate a second set of minislots, from among the continuous sequence of minislots, over the second communication channel having a second portion of the sequence of data to accommodate the second request.

8. The CMTS of claim 7, wherein the continuous sequence of minislots is further spread over a first super-frame from among a plurality of super-frames and a second super-frame from among the plurality of super-frames, wherein the first set of minislots is part of the first super-frame, and wherein the second set of minislots is part of the second super-frame.

9. The CMTS of claim 7, wherein information carrying capabilities of the first set of minislots differ from information carrying capabilities of the second set of minislots.

10. The CMTS of claim 9, wherein the information carrying capabilities of the first set of minislots and the information carrying capabilities of the second set of minislots comprise:
a data rate;
a code rate; or
a modulation scheme.

11. The CMTS of claim 7, further comprising:
a super-frame module configured to combine the first portion of the sequence of data and the second portion of the sequence of data to provide the sequence of data.

12. The CMTS of claim 7, wherein the second set of minislots and the first set of minislots form a single stream of continuous minislots over the first communication channel and the second communication channel.

13. The CMTS of claim 7, wherein the MAC is further configured to increase a bandwidth of the first communication channel to accommodate a symbol rate of the first communication channel.

14. A cable modem for communicating a sequence of data in accordance with a super-frame arrangement, the super-frame arrangement being characterized by a continuous sequence of minislots spread over a first communication channel and a second communication channel from among a plurality of communication channels, the cable modem comprising:
a Media Access Controller (MAC) configured to:
determine information carrying capabilities of a first set of minislots, corresponding to the first communication channel, from among the continuous sequence of minislots, such that the first set of minislots is aligned to compensate for interference caused by the first communication channel,
determine information carrying capabilities of a second set of minislots, corresponding to a second communication channel, from among the continuous sequence of minislots, such that the second set of minislots is aligned to compensate for interference caused by the second communication channel;
a super-frame module configured to:
arrange a first portion of the sequence of data onto the first set of minislots, and
arrange a second portion of the sequence of data onto the second set of minislots; and
a physical layer (PHY) configured to:
transmit the first set of minislots over the first communication channel, and
transmit the second set of minislots over the second communication channel.

15. The cable modem of claim 14, wherein the continuous sequence of minislots is further spread over a first super-frame and a second super-frame from among a plurality of super-frames, wherein the first set of minislots is part of the first super-frame, and wherein the second set of minislots is part of the second super-frame.

16. The cable modem of claim 14, wherein the information carrying capabilities of the first set of minislots differ from the information carrying capabilities of the second set of minislots.

17. The cable modem of claim 14, wherein the MAC is configured to determine the information carrying capabilities of the first set of minislots and the information carrying capabilities of the second set of minislots such that the first set of minislots communicate more information than the second set of minislots.

18. The cable modem of claim 14, wherein the MAC is configured to determine the information carrying capabilities of the first set of minislots and the information carrying capabilities of the second set of minislots such that the first set of minislots communicate larger packets than the second set of minislots.

19. The cable modem of claim 14, wherein the MAC is configured to:
select a first data rate from among a plurality of data rates for the first set of minislots; and
select a second data rate from among the plurality of data rates for the second set of minislots, wherein the first data rate is different from the second data rate.

20. The cable modem of claim 19, wherein the MAC is configured to select the first data rate and the second data rate by modulating the first communication channel using a first modulation scheme and by modulating the second communication channel using a second modulation scheme, wherein the second modulation scheme is different from the first modulation scheme.

* * * * *